Dec. 10, 1957     C. A. THOMMEN     2,816,038
SAUSAGE PACKAGE
Filed Oct. 31, 1955

INVENTOR.
CARL A. THOMMEN
BY R. G. Stoy
ATTORNEY

United States Patent Office 2,816,038
Patented Dec. 10, 1957

2,816,038

SAUSAGE PACKAGE

Carl A. Thommen, Western Springs, Ill., assignor to Swift & Company, Chicago, Ill., a corporation of Illinois Application October 31, 1955, Serial No. 543,909

1 Claim. (Cl. 99—174)

The present invention relates to a food package for sausages or the like that may be used to hold the product during the merchandising operations and in the preparation of the product for consumption.

The invention was devised principally for the merchandising of pre-cooked pork sausages which are in such a condition that all the housewife need do is heat them for a few minutes before serving them. However, it might be used in connection with the merchandising of other food products. The principal object and advantage of the present invention is that it may be employed by the housewife in the final heating or cooking carried out immediately prior to the serving of the product. It then may be discarded so that there is no necessity for any cleaning of pans, etc.

To achieve this end one of the requirements was that the package be relatively nominal in cost. If it were not, the merchandiser would find that he would not be competitive when he endeavored to use it in the sale of the sausages. A principal requirement is that the package is formed of a metal foil, preferably an aluminum foil. However, this introduces problems of strength and uniformity of cooking of the product which are solved by the present invention as brought out subsequently herein.

A further factor that had to be taken into consideration in this problem was the production of a pan that would hold a specific number of sausages, the number depending upon the past knowledge as to the number that the housewife would want to buy as being convenient for her to handle. The number, of course, may vary from time to time and from area to area. Generally, it will run between about six and twelve. The particular pan that I have devised is intended to hold eight sausages.

Further objects and advantages will become apparent from the following description taken in conjunction with the drawings, in which.

Figure 1:
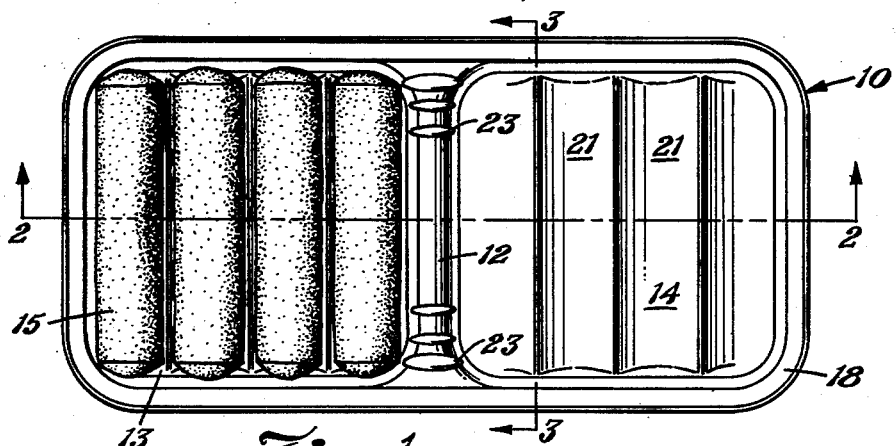
Figure 1 is a plan view of an embodiment of the invention prior to the placing of the cover thereon and showing four sausages in one side of the package.
Figure 2:
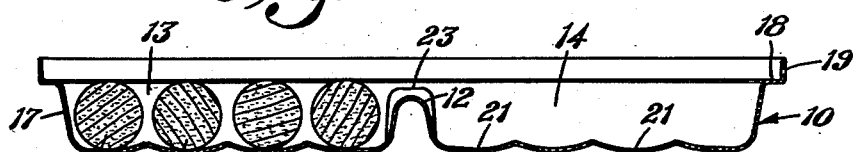
Figure 2 is a section taken at line 2—2 of Figure 1.
Figure 3:
Figure 3 is a section taken at line 3—3 of Figure 1.

The pan, generally 10, that forms the package is formed of a light gauge sheet aluminum. A foil having a gauge within the range of .0045 to .0055 has been found a suitable compromise in meeting the various factors of cost, rigidity and heating. The bottom 11 of the pan 10 has an upwardly re-entrant portion 12 which divides the pan into two compartments 13 and 14. Preferably each of the compartments is generally square. The raised re-entrant portion 12 extends at least half as high from the general level of the bottom 11 as the thickness of the sausages 15. The sides 17 of the pan 10 extend upwardly to at least the full thickness of the sausages and above that point the sides form a ledge 18 with an upstanding flange 19.

In each of the compartments 13 and 14 the bottom 11 is corrugated with each of the downwardly extending portions 21 being curvilinear, with each portion being a flatter or lesser curve than that of the circumference of the sausages 15. One downwardly extending portion 21 is provided for each of the sausages to be contained in the package.

Across the top of the re-entrant portion 12 are a plurality of raised ribs 23. The ribs are formed by further displacement of the foil forming the package and serve to give additional rigidity to the re-entrant portion of the package.

Figure 4:
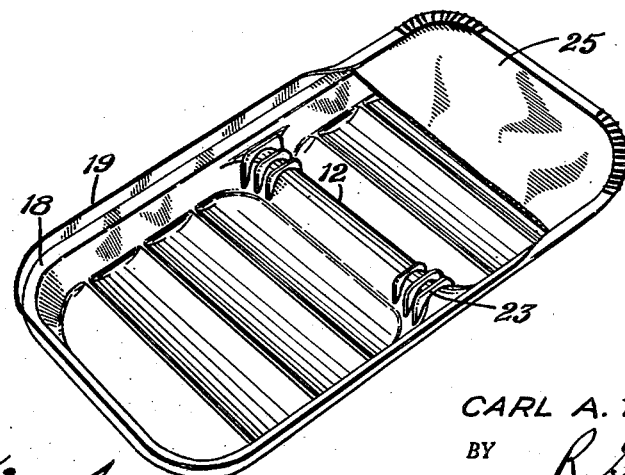
Figure 4 is an isometric view of a portion of the cover in place on the package.

A top 25 is provided of a size to fit within and rest on ledge 18. The top is then held in place over the product by flange 19 being bent down over the top as is seen at the right-hand end of Figure 4. In the preferred embodiment we employ a top formed of a single sheet of foil. The top in any event is removed from the pan by bending the flange 19 upwardly again before the sausages in the pan receive their final cooking. By using the top formed of a single sheet of foil, the housewife can use the top under the pan during cooking to aid in the distribution of heat. However, other forms of sheet material will serve adequately to hold the product in the pan during the merchandising thereof and prior to the product's consumption.

From the foregoing description it will be apparent that the pan 10 is quite inexpensive. It is formed from a single sheet which may be done on a mass production basis by pressing the sheet in a pair of dies.

The re-entrant portion 12 dividing the pan into substantially square compartments is very important in obtaining uniformity in the heating of the product before serving. Without this there is a disproportionate heating of the product in the various portions of the pan.

The dished downwardly extending portions 21 of the bottom 11 are important in the cooking of the product in the pan. In the first place they serve to hold a small amount of grease around the bottom of each of the sausages. The precooked sausages are provided with a light coating of grease about each of the sausages which melts and is trapped in the dished portion 21 and even if the pan is not perfectly level there is this grease about the bottom of each of the sausages to avoid sticking and burning problems. Additionally these dished portions 21 facilitate the uniform heating of the sausages 15 and prevents crowding of the sausages during the cooking process.

The foregoing detailed description is only for clearness of understanding and for the purpose of complying with 35 U. S. C. 112, and I do not desire to be limited to the exact details of construction shown and described for obvious modifications will occur to a person skilled in the art.

I claim:

A heatable package of sausages comprising: a plurality of sausages divided into two groups; a rectangular metal foil pan for enclosing the sausages having a bottom and four side walls, said sides upstanding a height at least equal to the thickness of the sausage and having an outwardly extending ledge at the top thereof with a bendable flange extending upwardly from said ledge; a centrally disposed, transverse re-entrant portion, dividing the bottom into two compartments and separating the groups of sausages, said reentrant portion being of a height at least equal to one-half the thickness of the sausages and extending the entire width of the pan and having formed therein a plurality of strengthening ridges extending in a direction transverse to the major dimension of said portion; a number of parallel dished areas in the bottom of each compartment equal to the number of sausages therein, whereby each sausage rests within a separate dished area and liquids released from said sausages when heated will be retained throughout the length of said area and facilitate even cooking of each sausage; and cover means for said pan and sausages adapted to rest on said ledge and held in place by said flange being bent over said cover.

References Cited in the file of this patent

UNITED STATES PATENTS

| | | |
|---|---|---|
| 87,314 | Wilmot | Feb. 23, 1869 |
| 472,811 | Pickett et al. | Apr. 12, 1892 |
| 581,232 | Hollandt | Apr. 20, 1897 |
| 1,103,169 | Beam | July 14, 1914 |
| 2,609,301 | Lindsey | Sept. 2, 1952 |
| 2,673,003 | Stewart | Mar. 23, 1954 |
| 2,674,536 | Fisher | Apr. 6, 1954 |
| 2,686,129 | Seiferth | Aug. 10, 1954 |